United States Patent
Colby

[15] 3,697,986
[45] Oct. 10, 1972

[54] COLLISION AVOIDANCE SYSTEM
[72] Inventor: Kenneth G. Colby, Barboursville, Va.
[73] Assignee: Sperry Rand Corporation
[22] Filed: Oct. 23, 1970
[21] Appl. No.: 83,396

[52] U.S. Cl..............................343/5 R, 343/112 CA
[51] Int. Cl..................................................G01s 9/02
[58] Field of Search...............343/5 R, 5 ST, 112 CA

[56] References Cited
UNITED STATES PATENTS
3,267,470   8/1966   Riggs...............343/112 CA X

*Primary Examiner*—T. H. Tubbesing
*Attorney*—S. C. Yeaton

[57] ABSTRACT

A collision warning and collision avoidance radar navigation system employs a modified tau-proximity collision warning criterion to derive an improved presentation on a storage type of radar plan position cathode ray indicator. An intruding target is labelled dangerous if the ratio of intruder closing range to his range rate is seen to be less than a predetermined value by the observation of the relative positions of synthesized radial lines or trails generated on the display for each target echo.

11 Claims, 5 Drawing Figures

United States Patent
Colby

INVENTOR.
KENNETH G. COLBY
BY
ATTORNEY

COLLISION AVOIDANCE SYSTEM

BACKGROUND OF THE INVENTION

1. FIELD OF THE INVENTION

The invention pertains to radio means for early warning of potential collisions between moving vehicles and more particularly relates to means adaptable for use in azimuth scanning radar systems for generating a cathode ray display providing a readily interpretable plan position presentation of factors indicating collision possibilities between marine vessels.

2. DESCRIPTION OF THE PRIOR ART

Various radio and other aids to marine navigation have been employed in the past for the purpose of warning ship operators of potential collisions between marine vessels and for preventing such collisions. While initial detection of possible intruding vessels has received much consideration, attention has increasingly been directed to the nearer range problems. Systems for assessing the near-target's range, range closure rate, bearing, and bearing rate have been exploited with some degree of success.

Detection systems assessing bearing rate and range rate data derived by radar and other sensors have not been distinctively successful. The detection of small bearing rates at large ranges does not lend itself to accurate instrumentation since small errors between successive bearing readings destroy the accuracy of prediction of the closest point of approach of an intruding vessel.

A technique often employed uses the passing distance at closest point of approach and may involve use of radar indicator reflection plotters, plotting tables, or photographic plotting systems. Of these systems, the expensive photographic plotting systems are possibly the most accurate, as few errors can be introduced by the operator. Reflection plotters are also of value, since transfer of data, though manual, is done in a way largely negating the possibility of serious errors. Errors in transfer of data by oral reporting and manual recording on plotting boards or tables can be very large. Generally, a single operator cannot accurately plot and assess the degree of danger attached to three potential targets simultaneously. Semiautomatic transfer of radar data to plotting boards has been attempted, but the instrumentation is expensive.

Recently, complex systems employing radar data in a track-while-scan mode operating in conjunction with a computer have been proposed for prediction of passing distance at the closest point of approach. Although these systems have improved prediction accuracy, their complexity and cost place them beyond the reach of many ship operators.

SUMMARY OF THE INVENTION

The invention is a collision probability assessment system employing a modified radar plan position display with an azimuth scanning radar system. It warns of intruding vessels and assesses the potential of collision by employment of a modified tau-proximity criterion, rather than the former closest point of approach criterion. Use of the modified tau-proximity criterion eliminates errors in the prior art systems associated with inaccurate bearing measurement. It is established that a closing-range intruder is dangerous by the visual observation of images stored on a direct viewing type of cathode ray storage tube. As a consequence of successive radar observations of a potential intruder, short radial lines or target range indices are stored on the screen of the indicator for each successive observation. Each range index starts at the actual then-present position of the target and extends radially outward from the center of display, which center represents ownships location. Visual examination is made of the degree of over-lap of successively generated range indices in assessing the character of the intruder.

DESCRIPTION OF THE PREFERRED EMBODIMENT

Figure 1A:
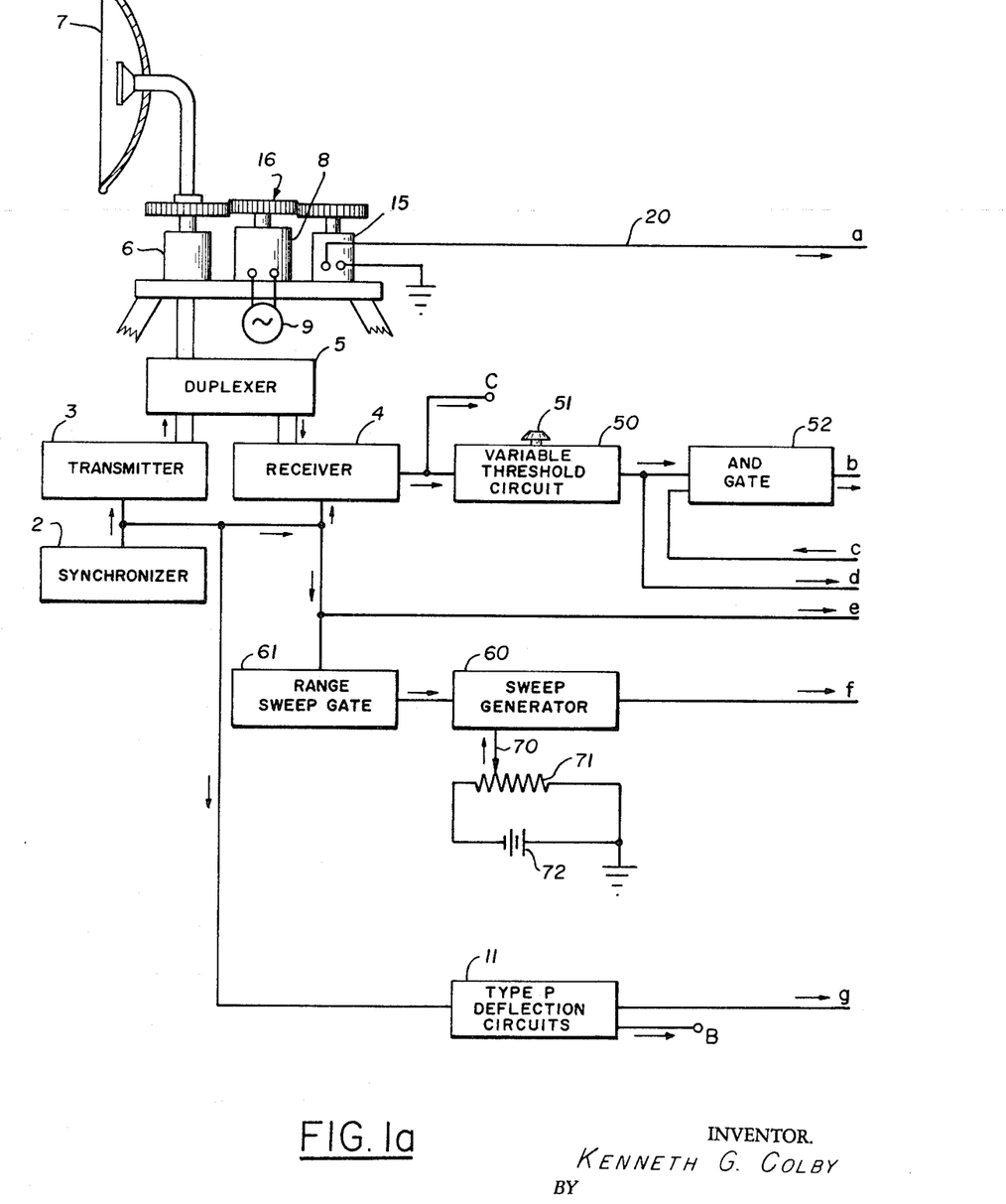
FIGS. 1a and 1b are a block diagram illustrating the invention as applied in an azimuth scanning radar system.
Figure 1B:
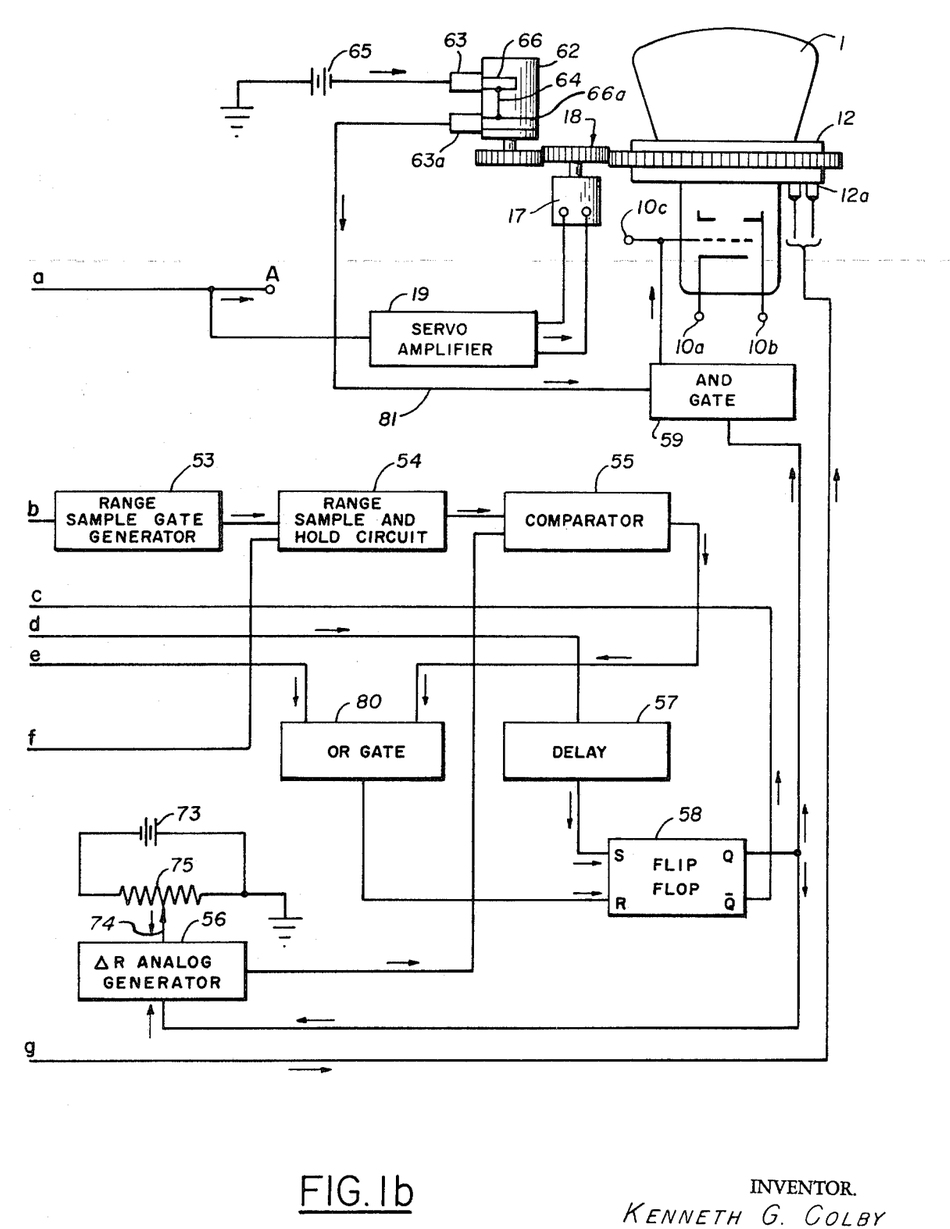

Referring to FIGS. 1a and 1b, a novel modification of a conventional azimuth scanning pulse radar system provides a collision warning display on a storage type of plan position indication cathode ray tube 1. A conventional radar synchronizer system 2 provides synchronizing control signals for the control of time relations of many of the signals in the various elements of the radar system in the usual manner. For example, it synchronizes the operation of pulse transmitter 3 and pulse receiver 4 so that transmitted signals and received echo signals respectively flow through conventional wave guide rotary joint 6 and duplexer 5 with respect to the platform-supported azimuth scanning antenna 7. In the usual operation of such a pulse radar system, the echo output at terminal C of pulse receiver 4 could be applied substantially directly to the intensifier control grid of an ordinary type P cathode ray indicator (not shown). In practice of the invention, such a conventional type P or plan position indicator may be advantageously placed side-by-side with storage tube indicator 1 to aid making of comparative observations.

Antenna 7 is illustrated as a conventional paraboloidal scanning antenna, though antennas of other azimuthally directive type may be substituted for paraboloidal antenna 7. Antenna 7 is driven at a constant rate by constant speed motor 8 using power from electrical power source 9; it is understood that source 9 may also be the source for supply of electrical power to other electrical power consuming elements of the radar system, as is the usual practice. For example, power supply 9 may supply appropriate voltages to cathode terminal 10a and anode terminal 10b of indicator 1.

Synchronizer 2 also has the role of synchronizing the radial sweeping of the intensified electron beam over the screen of indicator 1. For example, as in conventional practice, it supplies trigger pulses to type P deflection circuits 11. The sweep output of deflection generator 11, as in conventional practice, may be supplied via terminal B to a standard plan position indicator, as well as being supplied to the storage indicator 1.

Indicator 1 may be supplied with a conventional rotatable deflection coil yoke 12 equipped with slip rings and cooperating brushes 12a. The deflection signals from type P deflection circuit 11 are supplied to coil yoke 12 via brushes 12a and their associated slip rings. Alternatively, conventional electric field deflection of the electron beam may be used.

Again, as in conventional practice, the plan position presentation to appear on the screen of storage indicator 1 is realized by rotating the coil yoke 12 in synchronism with antenna 7. Such may be accomplished in any one of several known ways;

FIGS. 1a and 1b illustrates one known apparatus in which the constant speed antenna drive motor 8 drives a positional reference generator device 15 through gearing 16. The output of reference device or pick off 15 may be supplied via electrical lead 20 to the servo drive amplifier circuits 19, which circuits may include amplifiers and other usual positional servo elements, such as feed-back elements. The position and speed errors may be employed to drive the motor 17 which, in turn, drives coil yoke 12 through gearing 18 in faithful synchronism with the azimuth scanning of antenna 7. It is understood that the relative sizes of the elements of gearing 18 have been distorted purely for convenience in simplifying the drawing. Should a conventional type P navigation indicator also be employed, the signal at terminal A may drive a similar positional servo circuit and deflection yoke system associated therewith.

The novel elements of the inventive collision avoidance radar system yet to be described solve the problem of indicating the degree of collision danger between any target appearing on the display of indicator 1 and own ship. Although considered herein as primarily for ship collision warning, it is to be understood that the invention is applicable to aircraft collision warning or to employment in an active sonar system for submarine or other ship collision warning purposes. The novel warning system makes use of a modified tau collision warning criterion; the tau criterion has been shown in prior literature to be an effective and practical criterion for assessing likelihood of collision. In addition to the modified tau criterion, the new system may also employ a proximity or guard ring type of criterion to enhance the security of the vessel. The combined tau-proximity collision warning criterion has intrinsic advantages over other collision warning criteria, such as prior art constant bearing concepts, because the combined tau-proximity criterion does not require extreme accuracy of the radar data, nor does its use, as will be seen, involve complex mathematical computations.

Figure 2:
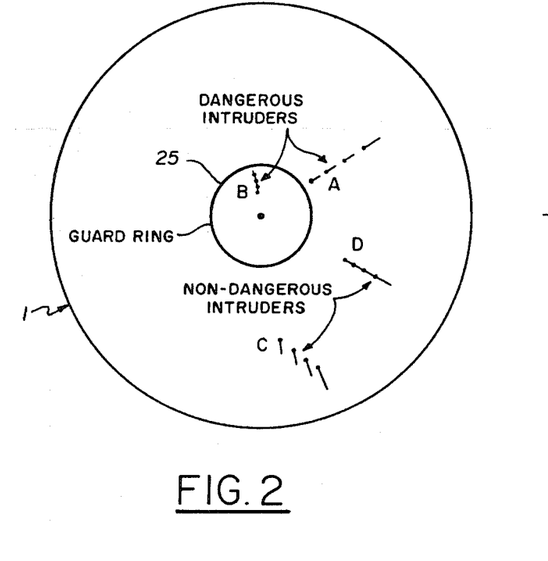
FIG. 2 is a view of the display produced by the invention, indicating intruding vessels of various degrees of collision potential.

The appearance of the display to be provided on the screen of storage indicator 1 is shown in FIG. 2. The combined tau-proximity warning criterion states that an intruder target is dangerous if the target is at a lesser range than a dangerous guard ring range indicated on the screen in FIG. 2 by a circular line 25 (the proximity criterion), or if the intruder is closing and the ratio of intruder range to range-rate is less than a critical value $\tau$ called the tau criterion. Target B of FIG. 2 is shown to be at less than the dangerous guard ring range and therefore represents a dangerous intruder. Target A is dangerous because it is characterized by the second criterion above. Targets C and D are not dangerous because they meet neither criterion, targets C and D being too slow. The successive paintings of the indicator screen are separated in time such that the intensified range indices on the display have a clearly discernible separation for targets indicated as dangerous according to the tau criterion. The tau criterion itself states that an intruder is dangerous if:

$$\tau = R/\dot{R} \qquad 1$$

where R is the range of the intruder, $\dot{R}$ is the range-rate of the intruder, and $\tau$ is the modified tau criterion or what amounts to a decision threshold parameter whose dimension is time and which may actually correspond to the time to the closest point of approach of two vessels.

In implementing the invention in one form, all of the radar echo returns for one frame time (the time for one azimuthal revolution of antenna 7) are stored on the screen of indicator 1 for continuous viewing. After the expiration of a time $\Delta t$, a second frame of target echoes is painted on the indicator screen and may be compared by direct visual observation with the elements of the previously painted frame. As seen in FIG. 2, the video is processed before application to storage indicator 1 to produce a short radial line or range index for each target echo, starting at the actual present position of the target and extending radially outward in range from that target present position for a distance which is a function of the a selected value of $\tau$ and of target present range. Visual comparison of the degree of overlap of a range index attached to a most recently painted target with the range index attached to its previously painted representation gives the viewer an indication of target range rate $\dot{R}$.

In practice, the circuit generating the range index is adjusted so that, for a given target and given values of $\tau$ and $\Delta t$, the point of closest approach of the target vehicle will occur in a time greater than $\tau$ whenever it is observed that the range indices generated during two successive painting frames over-lap in range. If the end of a range index for a particular target in a particular painting frame is at the same range as the beginning of the range index for the same target in the preceding frame, the closest point of approach will occur substantially at a time equal to $\tau$. The closest point of approach of the vessels will occur at a time less than $\tau$ if the end of the range index for a particular target in one frame is at a smaller range than the start of the range index for the same target in the preceding frame. Thus, when there is a multiplicity of vessels in the area of a ship equipped with the invention, an operator can determine directly and quickly from the display of indicator 1 which intruding vessels are potential collision threats. He may therefore devote his immediate attention to the potentially most dangerous threats.

The criterion expressed in equation (1) may be expressed in other terms; for example, equation (1) may be rewritten in the form:

$$R_2 = e^\lambda R_1 \qquad 2$$

For an approaching target, $R_1 > R_2$. Inversion and integration of equation (2) yields:

$$R_1 - R_2 = R_2 (e^\lambda - 1)$$

or:

$$\Delta R = R_2 (e^\lambda - 1) \qquad 3$$

where:

$$\lambda = \Delta t / \tau_1.$$

Here, it is understood that $\Delta R$ is the radial change in range for a given target between successive frame paintings separated by time $\Delta t$. The quantity $\tau_1$ is the predetermined value of time to closest point of approach, while $R_2$ is the range of the target at the time of the most recent painting.

Equation (3) is instrumented by the invention, as will be seen with reference to FIGS. 1a and 1b. Received target echoes are passed by receiver 4 to an adjustable threshold circuit 50. Circuit 50 is of conventional type and has a threshold level so adjusted that most clutter or noise spikes issuing from receiver 4 fall below the threshold level, while desired echo signals exceed the threshold level and are passed to a conventional AND gate 52. The actual threshold level of circuit 50 may be manually adjusted by operator adjustment of control 51 so as to accommodate viewing of indicator 1 depending on various prevailing noise or clutter conditions.

AND gate 52 has a second input whose nature remains to be discussed in further detail. When signals are present on both of its inputs, an output is directed to the range sample gate generator 53. Gate generator 53 may be any of several gate forming circuits such, for example, as a conventional single shot circuit. Its output, in effect, is a synthetic video signal of standardized duration and amplitude.

Any signals appearing at the output of range sampling gate generator 53 are passed to the range sample and hold circuit 54. Range sample and hold circuit 54 also has a second input, as will be explained, and the narrow gate generated by gate generator 53 samples and holds the value of any analog voltage present on that second input. The second input to range sample and hold circuit 54 is supplied by range sweep generator 60 which produces a sweep or ramp voltage whose length is dictated by the output of range sweep gate 61. The latter gate circuit is triggered by the output pulses from the radar system synchronizer 2. Range sample and hold circuit 54 may be any suitable available circuit for supplying a time-sampled and stored version of an input analog voltage to the input of comparator circuit 55.

The second input voltage to the known type of comparator circuit 55 is derived within $\Delta R$ analog generator 56, as will be seen. Within comparator circuit 55, the two input signals are compared in amplitude and their equality produces an output impulse supplied to OR gate 80 via a first input thereof. The radar system trigger pulse from synchronizer 2 is coupled to a second input of OR gate 80.

The selected echo signal is coupled from threshold circuit 50 through a delay circuit 57 to the SET input terminal of a conventional flip-flop circuit 58. The output of OR circuit 80 is supplied to the RESET terminal of circuit 58. Its Q-NOT output is the signal used to enable AND gate 52, which enablement permits a selected target echo to pass to the range sample gate generator 53. On the other hand, the Q output of flip-flop 58 serves two functions. It supplies an enabling pulse to a second AND gate 59 for permitting intensification of the electron beam of indicator 1. Secondly, it supplies a similarly timed integrator enabling pulse to $\Delta R$ analog generator 56.

Actual intensification and painting of a single-scan pattern of echoes is facilitated by a second input to indicator 1. This input may be a constant level unidirectional voltage present, for example, during a first of every ten scansions of antenna 7. It may be generated by various means, such as broadly represented in FIGS. 1b and 3 by the insulator drum 62 driven at a constant rate by gearing 18 from yoke drive motor 17. Drum 62 has one slip ring 66 of angular extend a, encompassing, for example, only one tenth of the drum periphery, and a second slip ring 66a forming a continuous loop about drum 62 and conductively joined to slip ring 66, as by lead 64. Brushes 63 and 63a, respectively cooperating with slip rings 66 and 66a, are used to complete a series circuit through electrical power source 65 to AND gate 59 for supplying an enabling voltage to the latter.

Figure 3:
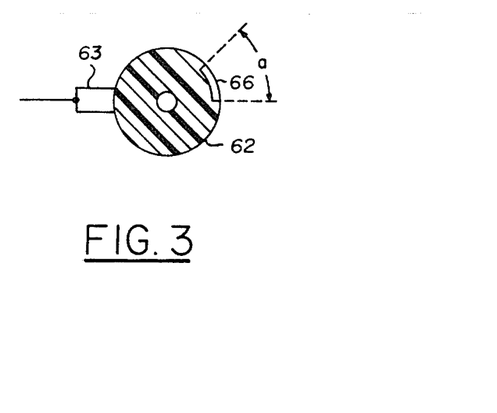
FIG. 3 is a fragmentary view, partly in cross section, of a part of the apparatus of FIG. 1.

It is seen that the drum-slip ring system abovedescribed, if coupled by gears of proper gear ratios to the constant speed drive motor 17, will permit one 360° painting of echoes on the screen of indicator 1 for each 10 scansions of antenna 7, there being no paintings for nine of the ten antenna scans. The angle at which painting starts may be adjusted in the conventional manner through use of differential gearing. Other gear ratios and other slip ring combinations would, in like manner, supply other time intervals between paintings of target echoes. A series of such gear-drum-slip ring systems may evidently be used, battery 65 manually switched to corresponding brushes such as brush 63 according to the inactive time interval desired. Other means for performing the function will be readily apparent to those skilled in the art.

It is clear that a storage tank 1 having a phosphor of moderate persistence may be employed over certain ranges of choice of storage time intervals when no additional painting is performed. On the other hand, various known means not necessarily part of the present invention may be employed to erase a painted display or a succession of such stored displays, making the disappearance of stored images relatively independent of the phosphor decay time. Such means known in the art include erasure of stored images by actinic radiation or by flooding of the interior surface of the storage phosphor layer with the electron flood beam, as well as other means.

In operation, radar system synchronizer 2 causes transmitter 3 to generate a high frequency carrier pulse emitted by antenna 7 and, at the same zero-range time, provides a trigger pulse to the range sweep generator 60. The same trigger pulse may also determine, by conventional circuit means (not shown), the time of generation of range guard circle 25 of FIG. 2, a circle which may typically represent a guard range of ten to twenty miles. Alternatively, guard ring 25 may simply be printed on the face of indicator 1.

The trigger pulse from synchronizer 2 also caused to pass through OR gate 80 at time $t=0$ to the RESET input of the flip-flop 58. The presence of the trigger pulse at the RESET input assures that flip-flop 58 will always be in the RESET state at the start of each radar system repetition cycle, with a ZERO output on flip-flop output Q and a ONE on output Q-NOT of flip-flop 58. In this circumstance, there can be no output from intensifier AND gate 59. In addition, the $\Delta R$ analog generator 56 is not triggered.

Range sweep gate 61, when triggered at time $t=0$ by the output of synchronizer 2, provides an output that starts operation of range sweep generator or integrator 60. A unidirectional reference voltage is supplied to generator 60 by electrical power source 72 according to the setting of tap 70 of potentiometer 71. This voltage has the value $K_1 c/2$, where $K_1$ is a scale factor and $c$ is the velocity of propagation of radio signals in air. Accordingly, sweep gate generator 61 determines the interval between transmitter operation and a succeeding time $t_1$ over which circuit 60 integrates the voltage $K_1 c/2$. The integrated term $$\frac{K_1 c}{2} \int_0^{t_1} dt$$

is supplied as a ramp signal to one input of range sample and hold circuit 54.

Operation of the system may now be further illustrated by consideration of a target echo arriving at receiver 4 at some arbitrary time $t_2$ after the transmitted signal, and therefore corresponding to a target having an arbitrary range $R_2$. Assuming that the echo of interest is of sufficient amplitude to pass through variable threshold circuit 50, it will pass also through AND gate 52, because AND gate 52 has automatically been enabled by the ONE-state condition of the Q-NOT output of flip-flop circuit 58. The output of AND gate 52 thus readily passes to the range sampling gate generator 53, which circuit generates a narrow gate or pulse signal representing the target of interest. The presence of the latter narrow gate causes the range sample and hold circuit 54 to sample the value of the output of the range sweep generator 60 at time $t_2$ and to store temporarily a signal which is a unidirectional analog of the range $R_2$ of the target of interest and to pass it to comparator circuit 55.

The actual target signal of interest also passes from variable threshold circuit 50 through a delay circuit 57 to the SET input of flip-flop circuit 58. On this event, the state of flip-flop circuit 58 is changed, so that a ONE appears at output Q and a ZERO at Q-NOT. Immediately, AND gate 52 is disabled, prohibiting the passage of any immediately following echo signal through it to generator 53. Delay circuit 57 produces only a relatively short delay, as its function is to assure that the selected target echo has successfully passed through AND gate 52 and has triggered range sampling gate generator 53 before AND gate 52 is disabled when flip-flop circuit 58 receives a RESET signal.

In the presence of the echo of interest, the Q output of flip-flop circuit 58 goes to ONE at time $t_2$, and the $\Delta R$ analog generator 56 is triggered. A unidirectional reference voltage is supplied to generator 56 by electrical power source 73 according to the setting by the operator of tap 74 of potentiometer 75. This voltage has the value $$K_2/(e^\lambda - 1)$$

where $K_2$ is a second scale factor. The integration is performed by $\Delta R$ analog generator 56 over the time interval determined by the state of the Q output of flip-flop circuit 58 and therefore proportional to the magnitude of the interval $\Delta R$:

$$V_1 = \frac{K_2 \int_{t_2}^{t_{\Delta R}} \delta t}{(e^\lambda - 1)} \quad (4)$$

As previously observed, the output $V_1$ of $\Delta R$ analog generator or integrator 56 is applied to one input of the comparator circuit 55, wherein it is compared to the unidirectional analog voltage $V_2$ representing the target range $R_2$ applied to a second input put from range sample and hold circuit 54:

$$V_2 = \frac{K_1 c t_2}{2} \quad (5)$$

At time $t_2$, when the $\Delta R$ analog generator circuit 56 starts integrating, $V_2$ is zero. Voltage $V_2$ increases with elapsing time. Adjustment of tap 70 permits the adjustment of scale factor $K_1$ in such a way that $V_1$ equals $V_2$ at a particular time $t_{\Delta R}$ which is seen to occur only when equation (3) is valid and the modified tau criterion is satisfied, since $t_{\Delta R} - t_2$ corresponds to the range increment $\Delta R$. At the time of coincident voltage levels in comparator 55, comparator 55 produces an output which passes through OR gate 80, resetting flip-flop circuit 58 to its original state. This event resets $\Delta R$ analog generator 56 to zero in a conventional manner. The AND gate 52 is then enabled, so that the signal processor system is ready to repeat its cycle, being ready to receive and to repeat the processing cycle on the appearance of the very next target echo.

It is thus seen that flip-flop circuit 58 is instrumental in producing synthetic pulses for use in intensifying the cathode ray beam trace in the phosphor of indicator 1, pulses each having a time duration $t_{\Delta R} - t_2$ and therefore corresponding to the magnitude of the range increment $\Delta R$ for substantially all target echo returns. It is understood that certain targets cannot produce intensified range indices; these are targets appearing on substantially the same azimuth during the time interval $t_{\Delta R} - t_2$, as such target presentations are automatically inhibited by the action of AND gate 52. All such target echoes as pass AND gates 52 and 59 are applied to the intensifier grid 10c of indicator 1 and are stored on the screen thereof for visual examination.

In describing the embodiment of FIGS. 1a and 1b, it has been assumed that antenna 7 is driven at an accurately constant rate by constant speed motor 8 and that indicator yoke drive motor 17 accurately follows the position of antenna 7. However, in some instances, for example, where a protective radome is lacking, it is not feasible to drive antenna 7 at a reasonably constant rate because of the effects of wind on the antenna. It is then desirable to employ a $\Delta t$ generator system which more accurately establishes the rate at which complete single frames of processed video are entered into storage on the screen of cathode ray indicator 1. The apparatus of FIG. 4 is then used to supply the enabling signal to input terminal 81 of AND gate 59, replacing commutator 62 and its associated apparatus.

Figure 4:
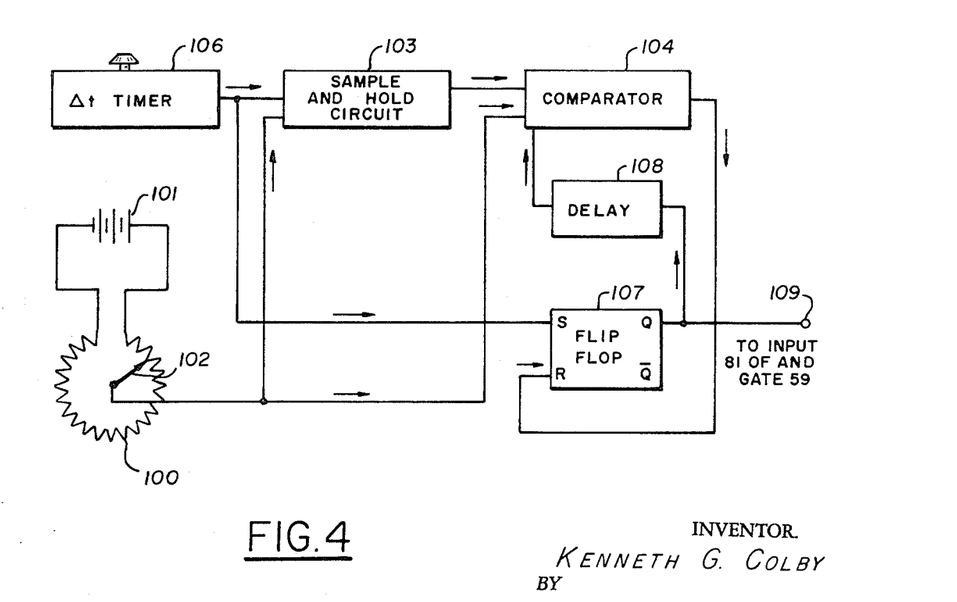
FIG. 4 is a block diagram of an alternative form of part of FIGS. 1a and 1b.

The Δt generator system of FIG. 4 comprises a rotary potentiometer 100 (used in place of commutator 62) whose rotating arm 102 is geared one-to-one with antenna 7 or yoke 12 and whose terminals are supplied with a unidirectional voltage by power source 101. The saw-toothed sweep produced when arm 102 is rotating is an analog of antenna position and is applied to one input terminal of sample and hold circuit 103 and to one input terminal of comparator circuit 104, circuits 103 and 104 each having first and second input terminals. Sample and hold circuit 103 may be generally similar to sample and hold circuit 54 of FIG. 1b, while comparator circuit 104 may be like comparator 55 of FIG 1b.

A second input to sample and hold circuit 103, in the form of an antenna bearing analog sampling gate, is generated by the Δt timer 106. The Δt timer 106 is an operator adjustable device of conventional nature which may take the form of a clock or other accurate timing device and which generates one narrow gate pulse at the end of each selected time interval Δt.

When the narrow gate pulse or antenna bearing analog sampling gate is applied to the second input of sample and hold circuit 103, the value of the saw-tooth sweep voltage analog of antenna bearing is instantaneously sampled and is applied as a stretched input to the second input terminal of comparator 104. It is seen that the stretched signal has a unidirectional magnitude proportional to the bearing of antenna 7 at the end of time interval Δt. The saw-toothed sweep voltage output of potentiometer 100 supplied to the first input of comparator 104 is compared to the stretched signal and, upon amplitude coincidence, a comparator output pulse is generated.

Flip-flop circuit 107, like flip-flop circuit 58 of FIG. 1b, has SET and RESET terminals and a Q output terminal (its Q-NOT output terminal is not used). The output of Δt timer 106 is connected to the SET input of flip-flop 107, while the output of comparator 104 is coupled to the flip-flop RESET terminal. The Q output of flip-flop 107 is coupled through short-period delay circuit 108 to provide an enabling signal to comparator 104, while it is also coupled to terminal 81 of AND gate 59 to act as an enabling gate for cathode ray indicator 1. Such operation depends upon arrival of the RESET trigger output of comparator 104 at one antenna scan later than the pulse produced at time Δt by timer 106.

It is seen that the Δt generator system of FIG. 4 establishes the rate at which complete single frames of processed video signals are painted on the screen of indicator 1. As the Δt pulse can occur at any bearing θ of radar antenna 7, the system stores the value of θ and produces a video enabling gate at the beginning of interval Δt at antenna bearing $\theta_1$, which gate persists until the antenna bearing increases to $\theta_1 + 2\pi$. This video enabling gate then enables AND gate 59, allowing synthetic video pulses to pass into indicator 1.

It is seen that the invention as discussed with reference to FIGS. 1a, 1b, and 4 may be used beneficially for collision warning and collision prevention purposes to protect marine and other craft and may be employed to advantage in azimuth scanning radar systems employing plan position or type P indicators. It is also to be understood that the invention may be used with other types of radar systems, for example, such as airborne radar systems employing types of antenna scanners that yield type B (range versus azimuth) information on cathode ray tube displays. It is seen also that the invention may be practiced employing simple, relatively standard circuits which have demonstrated reliability for an extended period of time in applications in radar systems and in other severe environments. The invention lends itself to instrumentation in relatively inexpensive and compact form as compared to many prior art systems, including complex situation plotting systems.

The invention avoids the fundamental inaccuracies of prior art systems by use of a modified tau criterion for recognizing dangerously intruding vessels. The invention avoids the possibility of fatal errors in the transfer of data from sensor systems to plotting boards or tables. The invention places a clear characteristic on successive display images of a closing target, each such demarcation taking the form of a range index of predetermined length. Marking each successive target position with a range index enhances its visibility and ensures a high probability of discovery by the radar operator. The danger status of all intruders is immediately determined upon observing the display. Furthermore, dangerous intruders tend to have constant bearing tracks that will generate on the display a chain of marks pointing toward own ship's position represented by the center of the plan position display.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. In a radar indicator system wherein an echo signal is represented by intensification of a cathode ray beam of said indicator and said system includes system synchronizer means providing synchronizing signals for synchronizing the start of the indicator deflection sweep wave for deflecting said cathode ray beam, means for intensifying said beam comprising:

echo signal receiver means having output means, signal generator means having first and second input means and first and second output means, first delay circuit means for coupling said receiver output means to said signal generator input means, second circuit means for cyclically applying to said signal generator second input means synchronizer signals from said system synchronizer means, third circuit means controlled by said receiver output means coupled to said signal generator second input means, means for applying an output of said signal generator first output means for enabling said third circuit means, means for applying an output of said signal generator second output means for causing said third circuit means when enabled to produce a signal, and means for applying an output of said signal generator second output means to intensify said beam of said radar indicator.

2. Apparatus as described in claim 1 wherein:

said signal generator means comprises bistable means, said signal generator first input means comprises SET means for said bistable means, and said signal generator second input means comprises RESET means for said bistable means.

3. Apparatus as described in claim 2 wherein said third circuit means comprises:
converter means for converting the time of occurrence of said echo signal relative to said synchronizing signal into an analog signal,
first sweep generator means triggered by the said signal generator second output means for providing an output sweep wave, and
comparator means for comparing the amplitudes of said analog signal and said output sweep wave for producing an output signal substantially during equality thereof.

4. Apparatus as described in claim 3 wherein said converter means comprises:
range sweep generator means triggered by said synchronizing signal and providing a range sweep wave, and
sample and hold circuit means having first and second input means and output means,
said first and second input means of said sample and hold circuit means being respectively supplied with said echo signal and said range sweep wave.

5. Apparatus as described in claim 2 wherein said echo signal receiver means includes variable amplitude threshold circuit means for selectively passing signals only above a selected amplitude to said first delay means and to said third circuit means.

6. Apparatus as described in claim 2 wherein said second circuit means includes OR gate means having first and second input means, said first and second OR gate input means being respectively coupled to said system synchronizer and to the output of said third circuit means.

7. Apparatus as described in claim 2 wherein said third circuit means includes first AND gate means enabled by the first output means of said signal generator means.

8. Apparatus as described in claim 2 wherein said means for applying an output of said signal generator second output means to intensify said beam includes second AND gate means having first and second input means and output means coupled to the intensifier grid of said indicator.

9. Apparatus as described in claim 8 including means for enabling said second AND gate during whole, time-separated paintings of displays on said cathode ray indicator.

10. Apparatus as described in claim 8 including:
azimuth scanning antenna means,
deflection means cooperating with said indicator and driven in synchronism with said antenna means,
switch means operated in synchronism with said antenna means for storing representations of echo signals received during a first complete painting scan interval of said indicator on said indicator screen, for inhibiting painting during a first subsequent interval substantially equal to said first interval, and for storing on said indicator screen representations of echo signals received during a painting scan interval subsequent to said first subsequent interval and substantially equal to said first interval.

11. In a radar indicator system wherein an echo signal is represented by intensification of a cathode ray beam of said indicator and said system includes system synchronizer means providing synchronizing signals for synchronizing the start of the indicator deflection sweep wave for radially deflecting said cathode ray beam, means for intensifying said beam comprising:
threshold circuit means having output means for selectively passing said echo signals only when greater than a predetermined amplitude,
bistable means having SET and RESET input means and first and second output means,
delay means coupled between said threshold circuit output means and said SET input means,
circuit means for connecting said system synchronizing signals to said RESET input means,
AND gate means having first and second input means and output means,
circuit means for connecting said threshold circuit output means to said first input means of said AND gate means,
circuit means for connecting said first output means of said bistable means to said second input means of said AND gate means,
first sweep generator means triggered by said system synchronizing signals and having output means,
sample and hold means having first and second input means,
circuit means for supplying the output of said AND gate means to said first input means of said sample and hold means,
circuit means for supplying the output of said first sweep generator means to said second input means of said sample and hold means,
comparator means having first and second input means,
circuit means for supplying an output of said sample and hold means to said first input of said comparator means,
second sweep generator means responsive to said bistable means second output means,
circuit means for supplying an output of said second sweep generator means to said second input of said comparator means,
means for providing an output of said comparator means to said RESET input means, and
means for connecting said second output of said bistable means to said indicator for intensifying said cathode ray beam.

* * * * *